United States Patent
Miyadera et al.

(12)

(10) Patent No.: US 6,284,211 B1
(45) Date of Patent: Sep. 4, 2001

(54) EXHAUST GAS CLEANER AND METHOD FOR REMOVING NITROGEN OXIDES

(75) Inventors: Tatsuo Miyadera, Tsukuba; Kiyohide Yoshida, Kumagaya, both of (JP)

(73) Assignees: Jiro Hiraishi of Director-General of Agency of Industrial Science & Technology, Tokyo (JP); KOCAT Inc., Seoul (KR)

( * ) Notice: Subject to any disclaimer, the term of this patent is extended or adjusted under 35 U.S.C. 154(b) by 0 days.

(21) Appl. No.: 08/295,012

(22) Filed: Aug. 24, 1994

(30) Foreign Application Priority Data

Aug. 26, 1993 (JP) .................................................. 5-234200

(51) Int. Cl.⁷ ........................................................ B01J 8/02
(52) U.S. Cl. .................................. 423/239.1; 423/240 S; 423/245.3; 423/247; 502/347; 502/305; 502/317; 502/312; 502/353
(58) Field of Search ............................ 423/239.1, 240 S, 423/245.3, 247; 502/347, 305, 317, 312, 353

(56) References Cited

U.S. PATENT DOCUMENTS

| | | | |
|---|---|---|---|
| 3,956,188 | * 5/1976 | Hindin et al. | 252/465 |
| 4,016,241 | * 4/1977 | Nishikawa et al. | 423/239 |
| 4,673,556 | * 6/1987 | McCabe et al. | 423/213.5 |
| 4,900,517 | * 2/1990 | Domesle et al. | 422/171 |
| 5,168,085 | * 12/1992 | Addiego et al. | 502/66 |
| 5,318,760 | * 6/1994 | Subramanian et al. | 423/239.2 |
| 5,320,999 | * 6/1994 | Muramatsu et al. | 502/303 |
| 5,384,110 | * 1/1995 | Muramatsu et al. | 423/239.1 |

FOREIGN PATENT DOCUMENTS

| | | |
|---|---|---|
| 0286967 | * 4/1988 | (EP) . |
| 0362960 | 4/1990 | (EP) . |
| 0455491 | 11/1991 | (EP) . |
| 0459396 | * 12/1991 | (EP) . |
| 0577438 | 1/1994 | (EP) . |
| 63100919 | 5/1988 | (JP) . |
| 63283727 | 11/1988 | (JP) . |
| 63294947 | 12/1988 | (JP) . |
| 1130735 | 5/1989 | (JP) . |
| 4-281844 | * 10/1992 | (JP) . |

OTHER PUBLICATIONS

Thesis 2A526, 1990, The 59th Spring Conference of the Japan Chemical Society, "Catalytic Cracking of Nitrogen Oxide Over Copper Zeolite (2)."

Thesis 3L420, 1990, The 60th Fall Conference of the Japan Chemical Society. "Development of Catalytic Removal Method of Nitrogen Oxide In Presence of $SO_x$."

Thesis 3L422, 1990, The 60th Fall Conference of the Japan Chemical Society. "Selective Reduction of Nixrogen Oxide by Hydrocarbons (1) Investigation of Zeolite Catalysts."

Thesis 3L423, 1990, The 60th Fall Conference of the Japan Chemical Society. "Selective Reduction of Nitrogen Oxide by Hydrocarbons (2) Investigations of Oxide Catalysts."

Selective Catalytic Reduction Of Nitrogen Oxides With Hydrocarbons. *Catalyst*, vol. 33, No. 2, 59 (1991).

* cited by examiner

*Primary Examiner*—Linda Gray
(74) *Attorney, Agent, or Firm*—Browdy and Neimark

(57) ABSTRACT

Nitrogen oxides are removed from an exhaust gas containing nitrogen oxides and oxygen in a proportion larger than its stoichiometric proportion relative to unburned components in the exhaust gas, by (i) disposing an exhaust gas cleaner in a flow path, the exhaust gas cleaner comprising a first catalyst composed of 0.2–20 parts by weight (on a metal basis) of silver or silver oxide supported on a porous inorganic oxide, and a second catalyst composed of 1–50 parts by weight (on an oxide basis) of tungsten and/or vanadium supported on a porous inorganic oxide; (ii) introducing oxygen-containing organic compounds having 2 or more carbon atoms or a fuel containing the oxygen-containing organic compounds into the exhaust gas on the upstream side of the exhaust gas cleaner; and (iii) bringing the exhaust gas into contact with the exhaust gas cleaner at a temperature of 150–650° C., thereby causing a reaction of the nitrogen oxides with the oxygen-containing organic compounds to remove the nitrogen oxides.

3 Claims, No Drawings

EXHAUST GAS CLEANER AND METHOD FOR REMOVING NITROGEN OXIDES

BACKGROUND OF THE INVENTION

The present invention relates to an exhaust gas cleaner for effectively removing nitrogen oxides from an exhaust gas containing nitrogen oxides and an excess proportion of oxygen, and a method for removing nitrogen oxides with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess proportion of oxygen. The term "containing an excess proportion of oxygen" means that the oxygen content is larger than its stoichiometric proportion relative to unburned components such as carbon monoxide, hydrogen, hydrocarbons in the exhaust gas. The term "nitrogen oxides" means nitrogen monoxide and/or nitrogen dioxide.

The nitrogen oxides are one cause of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is employed to catalytically and selectively reduce nitrogen oxides in an exhaust gas containing an excess proportion of oxygen, thereby removing nitrogen oxides from the exhaust gas.

However, such a method is disadvantageous, because ammonia is expensive, because ammonia is so toxic that the proportion of ammonia should be controlled by measuring the concentration of nitrogen oxides in the exhaust gas, and because this reduction system generally needs large apparatuses.

There has been proposed a method in which gases serving as a reducing agent, such as hydrogen, carbon monoxide, hydrocarbons etc. are brought into contact with nitrogen oxides, whereby the nitrogen oxides are non-selectively and catalytically reduced. In this method, the reducing agent must be added to the exhaust gas in a greater proportion than a stoichiometric proportion relative to oxygen in the exhaust gas to effectively remove nitrogen oxides from the exhaust gas, leading to an increased consumption of the reducing agent. For this reason, the method is applicable merely to the exhaust gas containing a small proportion of residual oxygen such as those generated almost under a theoretical air fuel ratio, resulting in limited application of the method to a narrow range of exhaust gases.

There have also been proposed methods of reducing nitrogen oxides by adding to an exhaust gas hydrocarbons in a smaller proportion than a stoichiometric proportion relative to oxygen in the exhaust gas, in the presence of a catalyst such as zeolite with or without carrying a transition metal (Japanese Patent Laid-Open Nos. 63-100919, 63-283727 and 1-130735; Thesis 2A526, 1990, the 59th Spring Conference of the Japan Chemical Society; Theses 3L420, 3L422 and 3L423, 1990, the 66th Catalysis Symposium, the Catalysis Society of Japan, 1990; and "Catalyst", Vol. 33, No. 2, p.59 (1991)).

However, these methods are effective only for removal of NOx having a narrow temperature range. Also, their efficiency of removing nitrogen oxides is extremely low in the case of an actual exhaust gas because it contains moisture.

OBJECT AND SUMMARY OF THE INVENTION

Accordingly, an object of the present invention is to provide an exhaust gas cleaner and a method capable of efficiently removing nitrogen oxides from an exhaust gas containing nitrogen oxides and oxygen in a proportion larger than the stoichiometric proportion relative to unburned components such as carbon monoxide, hydrogen, hydrocarbons, etc., which is discharged from stationary combustion apparatuses, gasoline engines operated under the condition of excess oxygen, and diesel engines.

As a result of intense research in view of the above objects, the inventors have found that when the exhaust gas is treated with a catalyst containing a silver component supported on a porous inorganic oxide, ammonia is produced as a by-product resulting from a reaction of oxygen-containing organic compounds such as ethanol, oxygen and nitrogen oxides. From this fact, the inventors have further found that nitrogen oxides are effectively removed even from exhaust gas containing about 10% of moisture by adding oxygen-containing organic compounds to the exhaust gas and by bringing the exhaust gas into contact with an exhaust gas cleaner comprising, in combination, (1) a first catalyst containing the silver component supported on the porous inorganic oxide and (2) a second catalyst containing tungsten oxide and/or vanadium oxide which are capable of reducing nitrogen oxides in the presence of ammonia. The present invention has been completed based on these findings.

Thus, the exhaust gas cleaner for removing nitrogen oxides from an exhaust gas containing nitrogen oxides and oxygen in a proportion larger than its stoichiometric proportion relative to unburned components in the exhaust gas according to the present invention comprises (1) a first catalyst composed of 0.2–20 parts by weight (on a metal basis) of silver or silver oxide as a catalytically active component supported on a porous inorganic oxide, and (2) a second catalyst composed of 1–50 parts by weight of tungsten oxide and/or vanadium oxide as a catalytically active component supported on a porous inorganic oxide.

The method for removing nitrogen oxides from an exhaust gas containing nitrogen oxides and oxygen in a proportion larger than its stoichiometric proportion relative to unburned components in the exhaust gas according to the present invention comprises (i) disposing an exhaust gas cleaner in a flow path of the exhaust gas, the exhaust gas cleaner comprising a first catalyst composed of 0.2–20 parts by weight (on a metal basis) of silver or silver oxide as a catalytically active component supported on a porous inorganic oxide, and a second catalyst composed of 1–50 parts by weight of tungsten oxide and/or vanadium oxide as a catalytically active component supported on a porous inorganic oxide; (ii) introducing oxygen-containing organic compounds having 2 or more carbon atoms or a fuel containing the oxygen-containing organic compounds into the exhaust gas on an upstream side of the exhaust gas cleaner; and (iii) bringing the exhaust gas into contact with the exhaust gas cleaner at a temperature of 150–650° C., thereby causing a reaction of nitrogen oxides with the oxygen-containing organic compounds to remove the nitrogen oxides.

DETAILED DESCRIPTION OF THE INVENTION

The present invention will be described in detail below.

An exhaust gas cleaner of the present invention comprises (1) a first catalyst composed of 0.2–20 parts by weight (on a metal basis) of silver or silver oxide as a catalytically active component supported on a porous inorganic oxide, and (2) a second catalyst composed of 1–50 parts by weight of tungsten oxide and/or vanadium oxide as a catalytically active component supported on a porous inorganic oxide. The exhaust gas cleaner is disposed in a flow path of the exhaust gas and brought into contact with the exhaust gas containing oxygen-containing organic compounds which is introduced to the flow path on an upstream side of the exhaust gas cleaner, whereby nitrogen oxides in the exhaust gas is efficiently reduced.

As mentioned above, in the exhaust gas cleaner of the present invention, a combination of the first and second catalysts is employed. Preferably, the first catalyst is disposed on an inlet side of the exhaust gas cleaner and the second catalyst is disposed on an outlet side of the exhaust gas cleaner. By such a configuration of the exhaust gas cleaner, a removal of nitrogen oxides from the exhaust gas can be performed in a wide temperature range.

(A) First Catalyst

The first catalyst is composed of a silver component as a catalytically active component and a porous inorganic oxide supporting the silver component on a surface thereof.

The silver component used as a catalytically active component of the first catalyst is silver or silver oxide.

The porous inorganic oxide may be a porous ceramic material having a high specific surface area and a high temperature resistance, and suitable examples include alumina, silica, titania, zirconia, a composite oxide thereof, etc. Among them, γ-alumina and composite oxides containing γ-alumina are preferable because these porous inorganic oxides advantageously cause an effective reaction of nitrogen oxides with oxygen-containing organic compounds and/or residual hydrocarbons.

A specific surface area of the porous inorganic oxide is preferably 10 $m^2/g$ or more. When the specific surface area is smaller than 10 $m^2/g$, the silver component is not well dispersed over the porous inorganic oxide, failing to remove nitrogen oxides efficiently.

The first catalyst comprises 0.2–20 parts by weight (on a metal basis) of the catalytically active silver component based on 100 parts by weight of the porous inorganic oxide. When the amount of the silver component is less than 0.2 parts by weight (on a metal basis), a removal ratio of nitrogen oxides is low. When the amount of the silver component is more than 20 parts by weight (on a metal basis), oxygen-containing organic compounds are likely to be oxidized by oxygen, resulting in decrease in the removal ratio of nitrogen oxides. The preferred amount of the silver component is 0.5–15 parts by weight (on a metal basis) based on 100 parts by weight of the porous inorganic oxide. Incidentally, the silver component is in the form of a metal or a metal oxide in the temperature range of the exhaust gas. The silver component is easily convertible from a metal state to a metal oxide state and vice versa in such a temperature range.

The silver component may be carried by the porous inorganic oxide by known methods such as an impregnation method, a precipitation method, a sol-gel method, etc. In the case of the impregnation method, the porous inorganic oxide is impregnated with an aqueous solution of silver nitrate, etc., dried at about 70° C., and burned at a temperature elevating stepwise from 100° C. to 600° C. The first catalyst is preferably subjected to a final oxidation treatment at a temperature of 300–650° C.

(B) Second Catalyst

The second catalyst is composed of a catalytically active component capable of reducing nitrogen oxides in the presence of ammonia generated by the first catalyst, and a porous inorganic oxide. The preferred catalytically active component of the second catalyst is tungsten oxide and/or vanadium oxide. The porous inorganic oxide may be a porous ceramic material having a high specific surface area and a high temperature resistance, and their suitable examples includes titania, alumina, a composite inorganic oxide containing titania, zirconia, etc. Among them, titania and the composite inorganic oxide containing titania are preferable.

A total amount of the catalytically active component is in the range of 1–50 parts by weight of the tungsten oxide and/or vanadium oxide, preferably 2–40 parts by weight thereof based on 100 parts by weight of the porous inorganic oxide. Even though the amount of the catalytically active component exceeds 50 parts by weight, no further improvement of the removal ratio (reduction rate) of nitrogen oxides can be achieved. On the other hand, when the amount is less than 1 part by weight, the removal ratio of nitrogen oxide is low. By using tungsten oxide and/or vanadium oxide, nitrogen oxides can be more effectively removed from the exhaust gas in the presence of ammonia generated by the first catalyst.

The catalytically active component may be carried by the porous inorganic oxide by known methods such as an impregnation method, a precipitation method, a sol-gel method, etc. In the case of the impregnation method, the porous inorganic oxide is impregnated with an aqueous solution of ammonium salt, oxalate, etc. of the catalytically active element (tungsten and/or vanadium), dried at 70° C., and burned at a temperature elevating stepwise from 100° C. to 600° C. in an air or oxygen stream. In a normal temperature range of the exhaust gas, the catalytically active component supported on the porous inorganic oxide is in a metal oxide state.

(C) Preferred Types of Exhaust Gas Cleaner

[1] First Type of Exhaust Gas Cleaner

A first type of the exhaust gas cleaner according to the present invention is constituted by first and second catalysts each composed of the catalytically active component and a powdery porous inorganic oxide as a carrier, and an exhaust gas cleaner substrate on which the first and second catalysts are coated.

The exhaust gas cleaner substrate used for carrying the first and second catalysts may be made of a porous ceramic material having a large surface area and a high-temperature resistance. Suitable examples of the ceramic material include γ-alumina and its composite oxide such as γ-alumina-titania, γ-alumina-silica and γ-alumina-zirconia, zirconia, titania-zirconia, etc. In a case where a high temperature resistance is required, the exhaust gas cleaner substrate may be made of cordierite, mullite, alumina or composite oxides thereof, etc. Alternatively, metal substrates known in conventional exhaust gas cleaners can be also employed in the present invention.

A shape and a size of the exhaust gas cleaner substrate are variously altered depending upon its applications. The exhaust gas cleaner substrate is preferably composed of 2 or more separate portions including at least an inlet portion and an outlet portion on which the first and second catalysts mentioned above can be separately provided. A preferred structure of the exhaust gas cleaner substrate includes a three-dimensional structure such as a honey-comb, a foam and a refractory fiber assembly, granulates, pellets, etc. In the case of the honey-comb structure, the exhaust gas cleaner substrate is preferably made of cordierite or mullite.

In the first type of the exhaust gas cleaner, the first catalyst is coated on the exhaust gas cleaner substrate as mentioned above. A thickness of the first catalyst provided on the exhaust gas cleaner substrate may be determined depending upon the difference in thermal expansion coefficients between the exhaust gas cleaner substrate and the first catalyst. The thickness of the first catalyst is preferably 300 µm or less. By coating the first catalyst having such a thickness on the exhaust gas cleaner substrate, the exhaust gas cleaner is prevented from damage due to thermal shock, etc.

The first catalyst may be applied to the exhaust gas cleaner substrate by known methods such as a wash-coating method, a sol-gel method, etc.

A proportion of the first catalyst applied to the exhaust gas cleaner substrate is preferably 20–300 g/l. When the proportion is less than 20 g/l, nitrogen oxides cannot be effectively removed. On the other hand, even though the proportion of the first catalyst used exceeds 300 g/l, a further improvement in removal ratio cannot be obtained and a pressure drop in the catalytic reaction system rather increases. The proportion of the first catalyst is more preferably in the range of 50–250 g/l.

In the first type of the exhaust gas cleaner, a thickness of the second catalyst applied onto a surface of the exhaust gas cleaner substrate is preferably 300 µm or less. By forming the second catalyst having such a thickness on the exhaust gas cleaner substrate, the exhaust gas cleaner is prevented from damage due to thermal shock, etc. A proportion of the second catalyst applied to the exhaust gas cleaner substrate is preferably 20–300 g/l.

The second catalyst may be supported on the exhaust gas cleaner substrate by known methods such as a wash-coating method, a sol-gel method, etc.

[2] Second Type of Exhaust Gas Cleaner

In the second type of the exhaust gas cleaner according to the present invention, a porous inorganic oxide used as carriers of the first and second catalysts is in the form of pellets or granulates. The pellets or the granulates supporting the catalytically active components can serve as the exhaust gas cleaner without a substrate. For instance, the exhaust gas cleaner can be directly charged into a casing, a pipe, etc. and then held in place for final uses.

[3] Other Types of Exhaust Gas Cleaner

In the other types of the exhaust gas cleaner, the exhaust gas cleaner substrates may be made of the same porous inorganic oxides as those usable as carriers in the first and second types of the exhaust gas cleaners. For instance, when the exhaust gas cleaner substrate of the first catalyst is made of alumina and that of the second catalyst is made of titania, the catalytically active components of the first and second catalysts can be directly coated and supported onto the exhaust gas cleaner substrate without carrier. Further, in a still other type of the exhaust gas cleaner, the porous inorganic oxide supporting the catalytically active component may be molded to an adequate shape such as a honey-comb, pellets, etc.

In any types of the exhaust gas cleaners mentioned above, the weight ratio of the first catalyst to the second catalyst is suitably in the range of 10/1 to 1/5. When the weight ratio is less than 1/5, namely when the content of the first catalyst is small, the removal ratio of nitrogen oxides from the exhaust gas is totally lowered in a wide temperature range of 250–600° C. On the other hand, when the weight ratio exceeds 10/1, namely the content of the second catalyst is small relative to the first catalyst, ammonia generated by the first catalyst is likely to be discharged in an unreacted state, increasing a proportion of ammonia in the discharged exhaust gas. The weight ratio of the first catalyst to the second catalyst is more preferably in the range of 4/1 to 1/4.

By using the exhaust gas cleaner constructed above, nitrogen oxides can be effectively removed even from the exhaust gas containing about 10% of a moisture in such a wide temperature range as 150–650° C.

(D) Method for Removing NOx

First, the above-mentioned exhaust gas cleaner is disposed in a flow path of the exhaust gas. Preferably, the first catalyst is located on an inlet side of the exhaust gas cleaner and the second catalyst is located on an outlet side of the exhaust gas cleaner.

The exhaust gas itself contains unburned hydrocarbons such as ethylene, propylene, etc. which can serve as a reducing agent. However, since amounts of the unburned hydrocarbons are insufficient to remove nitrogen oxides, additional reducing agents such as oxygen-containing organic compounds must be introduced into the flow path of the exhaust gas on an upstream side of the exhaust gas cleaner.

The oxygen-containing organic compounds used in the method of the present invention include alcohols having 2 or more carbon atoms such as ethanol, isopropyl alcohol, or a fuel containing such alcohols. An amount of the oxygen-containing organic compounds introduced into the flow path of the exhaust gas may be determined such that a weight ratio of the oxygen-containing organic compounds to nitrogen oxides is in the range of 0.1 to 5. When the weight ratio is less than 0.1, a removal ratio of nitrogen oxides is low. On the other hand, when the weight ratio exceeds 5, fuel efficiency is likely to be deteriorated.

Further, in a case where the fuel is employed as a carrier of the oxygen-containing organic compounds, suitable examples of the fuel include gasoline, diesel oil, kerosene, etc. In this case, an amount of the fuel containing the oxygen-containing organic compounds, which is introduced into the exhaust gas, is adjusted such that the weight ratio of the oxygen-containing organic compounds to nitrogen oxides falls in the range of 0.1 to 5.

To proceed a reduction or removal treatment of nitrogen oxides with the oxygen-containing organic compounds, etc., a total apparent space velocity of the exhaust gas cleaner is 500,000 h$^{-1}$ or less. When the apparent space velocity exceeds 500,000 h$^{-1}$, a reduction reaction of nitrogen oxides cannot be sufficiently carried out, leading to poor removal ratio of nitrogen oxides. The preferred space velocity is 300,000 h$^-$or less.

In the method of the present invention, the exhaust gas passing through the exhaust gas cleaner is kept at a temperature of 150–650° C. to effectively react the oxygen-containing organic compounds with the nitrogen oxides. When the temperature of the exhaust gas is lower than 150° C., the reaction of the reducing agent with nitrogen oxides cannot proceed, leading to poor removal ratio of nitrogen oxides. On the other hand, when the temperature of the exhaust gas exceeds 650° C., a reaction between the oxygen-containing organic compounds and oxygen predominantly occurs, failing to achieve a high reduction or removal of nitrogen oxides. The temperature of the exhaust gas is preferably 250–600° C.

The present invention will be described in further detail by way of the following Examples.

Example 1

10 g of commercially available γ-alumina pellets (diameter: 1.5 mm, length: about 2–3 mm, specific surface area: 260 m$^2$/g) were immersed in an aqueous solution of silver nitrate to carry 2 parts by weight (on a metal basis) of silver based on 100 parts by weight of γ-alumina pellets.

Thereafter, they were dried, heated to 600° C. stepwise in an air stream to produce an exhaust gas cleaner I comprising silver or silver oxide particles.

6.2 ml of water was added to 1.8 g of ammonium tungustate para-pentahydrate and 1.0 g of oxalic acid. The mixture was heated on a water bath to obtain a solution. After cooling the solution, 10 g of titania (diameter: 0.5–2.0 mm, specific surface area: 35 m²/g) was immersed therein. for 30 minutes. Thereafter, the titania was taken out of the solution and dried in an air at 80° C. for 2 hours, at 100° C. for 2 hours and then at 120° C. for 2 hours. The dried titania was then heated from 120° C. to 500° C. in a nitrogen stream containing 20% of oxygen for 5 hours and burned at 500° C. for 4 hours to prepare an exhaust gas cleaner II carrying 9.5 parts by weight of $WO_3$ based on 100 parts by weight of titania.

The exhaust gas cleaners I and II produced above were set in a cylindrical reactor such that 3.13 ml of the exhaust gas cleaner I was disposed on an upstream side (an inlet side), and 3.13 ml of the exhaust gas cleaner II was disposed on a downstream side (an outlet side). Next, a test gas having a composition shown in Table 1 was caused to pass through the reactor at a rate of 2.0 liters (in a normal state) per minute, which corresponded to a total apparent space velocity of 19,200 $h^{-1}$. The temperature of the test gas in the reactor was maintained at 300–550° C. to cause a reaction of nitrogen oxides with ethanol.

The concentration of nitrogen oxides (sum of nitrogen monoxide and nitrogen dioxide) in the test gas after passing through the exhaust gas cleaners I and II was measured by a chemiluminescence analyzer to determine the removal ratio of nitrogen oxides. The results are shown in Table 2.

TABLE 1

| Component | Concentration |
| --- | --- |
| Nitrogen monoxide | 1,000 ppm (on a dry basis) |
| Carbon dioxide | 10 volume % (on a dry basis) |
| Oxygen | 10 volume % (on a dry basis) |
| Ethanol | 1,250 ppm (on a dry basis) |
| Nitrogen | Balance |
| Water | 10 volume % based on the total of the above components. |

Example 2

γ-Alumina powder (specific surface area: 200 m²/g) was immersed in an aqueous solution of silver nitrate to carry 2 parts by weight of silver based on 100 parts by weight of γ-alumina powder, and about 1.0 g of the resulting catalyst was supported on a commercially available honeycomb-type cordierite filter (diameter: 30 mm, length: about 12.6 mm, 400 cells/in²) by a wash-coating method, dried, burned at a temperature elevated to 600° C. stepwise to produce an exhaust gas cleaner I.

20 g of $V_2O_5$ was dispersed in 30 ml of water. While stirring and heating the resultant dispersion at 80° C. on a water bath, 43 g of oxalic acid was gradually added to the dispersion, and further stirred on a water bath at about 90° C. for 1 hour. After cooling it at room temperature, water was added to the resultant suspension to make a total volume of 80 ml. Added to 4 ml of the aqueous suspension was 2.8 ml of water to obtain a total volume of 6.8 ml. 10 g of titania powder was immersed in 6.8 ml of the aqueous suspension for 30 minutes to produce a slurry. 1.0 g (dry basis) of the slurry was applied onto the same honeycomb-type cordierite filter as used in the production of the exhaust gas cleaner I. The honeycomb-type cordierite filter was dried and burned under the same conditions as in Example 1 to produce an exhaust gas cleaner II comprising 6 parts by weight of $V_2O_5$ based on 100 parts by weight of the titania.

The two exhaust gas cleaners I and II were set in a cylindrical reactor such that the exhaust gas cleaner I was disposed on an upstream side and the exhaust gas cleaner was disposed on a downstream side. Next, a test gas having a composition shown in Table 1 was caused to pass through the reactor at an apparent space velocity of 14,800 $h^{-1}$. To evaluate the removal ratio of nitrogen oxides, the measurements were conducted in the same manner as in Example 1. The results are also shown in Table 2.

Comparative Example 1

An exhaust gas cleaner I was prepared in the same manner as in Example 1. 3.13 ml of the exhaust gas cleaner I was set in the cylindrical reactor and the test gas having a composition shown in Table 1 was caused to pass through the reactor. To evaluate the removal ratio of nitrogen oxides, the measurements were conducted in the same manner as in Example 1. The results are also shown in Table 2.

Comparative Example 2

An exhaust gas cleaner I was prepared in the same manner as in Example 1. 6.26 ml of the exhaust gas cleaner I was set in the cylindrical reactor. The test gas having a composition shown in Table 1 was caused to pass through the reactor. To evaluate the removal ratio of nitrogen oxides, the measurements were conducted in the same manner as in Example 1. The results are also shown in Table 2.

Comparative Example 3

An exhaust gas cleaner II was prepared in the same manner as in Example 1. 3.13 ml of the exhaust gas cleaner II was set in the cylindrical reactor. The test gas having a composition shown in Table 1 was caused to pass through the reactor. To evaluate the removal ratio of nitrogen oxides, the measurements were conducted in the same manner as in Example 1. The results are also shown in Table 2.

TABLE 2

| | Removal Ratio of Nitrogen Oxides (%) | | | | |
| --- | --- | --- | --- | --- | --- |
| Temp. (° C.) | Ex. 1 | Ex. 2 | Com. Ex. 1 | Com. Ex. 2 | Com. Ex 3 |
| 300 | 74.8 | 75.5 | 70.2 | 91.9 | 0.0 |
| 350 | 95.2 | 98.7 | 89.8 | 97.6 | 0.0 |
| 400 | 97.7 | 97.5 | 92.1 | 96.1 | 0.0 |
| 450 | 96.7 | 96.5 | 87.4 | 90.3 | 0.0 |
| 500 | 87.3 | 87.4 | 73.1 | 77.6 | 0.0 |
| 550 | 63.4 | 64.0 | 52.4 | 55.0 | 8.1 |

As is clear from Table 2, the exhaust gas cleaners of Examples 1–2 have a high removal ratio of nitrogen oxides in a wide temperature range of the exhaust gas. On the other hand, in Comparitive Examples 1–2 in which the exhaust gas cleaner containing a silver component alone was employed, nitrogen oxides were removed only in a narrow temperature range of the exhaust gas. Further, in Comparative Example 1, ammonia was detected from the exhaust gas which had passed through the exhaust gas cleaner, while no ammonia was detected from the exhaust gas in Examples 1 and 2. In Comparative Example 3 in which the exhaust gas cleaner II containing a tungsten component alone was employed, substantial part of the nitrogen oxide was not removed from the exhaust gas.

What is claimed is:

1. A method for removing nitrogen oxides from an exhaust gas containing oxygen in a proportion larger than the stoichiometric proportion of said oxygen relative to unburned components in said exhaust gas, comprising the steps of:

(i) disposing an exhaust gas cleaner in a flow path of said exhaust gas, said exhaust gas cleaner consisting essentially of a first catalyst consisting essentially of 0.2–20 parts by weight on a metal basis of silver or silver oxide supported on 100 parts by weight of a porous inorganic oxide selected from the group consisting of γ-alumina and a composite oxide containing γ-alumina, and a second catalyst consisting essentially of of 1–50 parts by weight on an oxide basis of at least one oxide selected from the group consisting of tungsten oxide and vanadium oxide supported on 100 parts by weight of a porous inorganic oxide selected from the group consisting of titania, alumina and a composite oxide containing titania;

(ii) introducing oxygen-containing inorganic compounds having two or more carbon atoms or a fuel containing said oxygen-containing organic compounds into said exhaust gas on an upstreamside of said exhaust gas cleaner; and (iii) bringing said exhaust gas into contact with said exhaust gas cleaner at a temperature of 150–650° C., thereby causing a reaction of said nitrogen oxides with said oxygen-containing organic compounds to remove said nitrogen oxides.

2. The method for removing nitrogen oxides according to claim 1, wherein said exhaust gas cleaner further comprises a three-dimensional structure of ceramics or metal on which said first and second catalysts are coated.

3. The method for removing nitrogen oxides according to claim 2, wherein said three-dimensional structure is composed of 2 or more portions on which said first catalyst and said second catalyst are coated separately.

* * * * *